United States Patent
Tsuboi

(10) Patent No.: US 11,222,097 B2
(45) Date of Patent: Jan. 11, 2022

(54) INFORMATION PROCESSING APPARATUS, INFORMATION PROCESSING METHOD, AND COMPUTER-READABLE MEDIUM

(71) Applicant: CANON KABUSHIKI KAISHA, Tokyo (JP)

(72) Inventor: Masanori Tsuboi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 15/891,172

(22) Filed: Feb. 7, 2018

(65) Prior Publication Data

US 2018/0232503 A1    Aug. 16, 2018

(30) Foreign Application Priority Data

Feb. 14, 2017    (JP) .............................. JP2017-024960

(51) Int. Cl.
 *G06F 21/10*    (2013.01)
 *G06F 21/12*    (2013.01)

(52) U.S. Cl.
 CPC .......... *G06F 21/121* (2013.01); *G06F 21/105* (2013.01)

(58) Field of Classification Search
 CPC .............................. G06F 21/121; G06F 21/105
 See application file for complete search history.

(56) References Cited

U.S. PATENT DOCUMENTS

| | | | | |
|---|---|---|---|---|
| 6,499,035 B1* | 12/2002 | Sobeski | ................... | G06F 9/465 |
| 6,889,212 B1* | 5/2005 | Wang | .................... | G06Q 30/018 |
| | | | | 370/259 |
| 6,968,384 B1* | 11/2005 | Redding | ................ | G06F 21/105 |
| | | | | 705/52 |
| 8,195,124 B2* | 6/2012 | Minear | ................... | G06F 21/10 |
| | | | | 455/405 |
| 9,098,677 B2* | 8/2015 | Holloway | ................ | G06F 21/10 |
| 9,684,781 B2* | 6/2017 | Selig | ...................... | H04L 63/108 |
| 2002/0019814 A1* | 2/2002 | Ganesan | .................. | H04L 63/10 |
| | | | | 705/59 |
| 2002/0169974 A1* | 11/2002 | McKune | .................. | G06F 21/10 |
| | | | | 726/31 |
| 2002/0194010 A1* | 12/2002 | Bergler | ................... | G06Q 10/10 |
| | | | | 705/310 |
| 2003/0105890 A1* | 6/2003 | Sakuma | .................. | G06F 21/10 |
| | | | | 710/1 |

(Continued)

FOREIGN PATENT DOCUMENTS

| | | |
|---|---|---|
| JP | H11-085500 A | 3/1999 |
| JP | 2002-175129 A | 6/2002 |
| JP | 2012-221054 A | 11/2012 |

*Primary Examiner* — Samson B Lemma
*Assistant Examiner* — Abdullah Almamun
(74) *Attorney, Agent, or Firm* — Canon U.S.A., Inc. IP Division

(57) ABSTRACT

An image forming apparatus installs a license instructed to be installed when a reliable date has been successfully acquired from a server. When the reliable date fails to be acquired and the license instructed to be installed is a valid-days-designated license, the information forming apparatus installs the valid-days-designated license based on the image forming apparatus' built-in clock. When the reliable date fails to be acquired and the license instructed to be installed is an expiration-date-designated license, the information forming apparatus does not install the expiration-date-designated license.

9 Claims, 8 Drawing Sheets

(56) References Cited

U.S. PATENT DOCUMENTS

| | | | | |
|---|---|---|---|---|
| 2005/0289072 | A1* | 12/2005 | Sabharwal | G06F 21/121 |
| | | | | 705/59 |
| 2009/0165083 | A1* | 6/2009 | McLean | G06F 21/10 |
| | | | | 726/1 |
| 2009/0323107 | A1* | 12/2009 | Maeda | G03G 15/50 |
| | | | | 358/1.15 |
| 2010/0299723 | A1* | 11/2010 | Holloway | G06F 21/10 |
| | | | | 726/4 |
| 2012/0144195 | A1* | 6/2012 | Nair | H04N 7/1675 |
| | | | | 713/168 |
| 2013/0239232 | A1* | 9/2013 | Yoakum | G06F 21/121 |
| | | | | 726/29 |
| 2014/0108242 | A1* | 4/2014 | Stefik | H04L 9/3297 |
| | | | | 705/41 |
| 2014/0122350 | A1* | 5/2014 | Takemoto | G06Q 30/018 |
| | | | | 705/317 |
| 2017/0024548 | A1* | 1/2017 | Dorwin | G06F 16/9535 |
| 2017/0357784 | A1* | 12/2017 | Duda | G06F 21/105 |

* cited by examiner

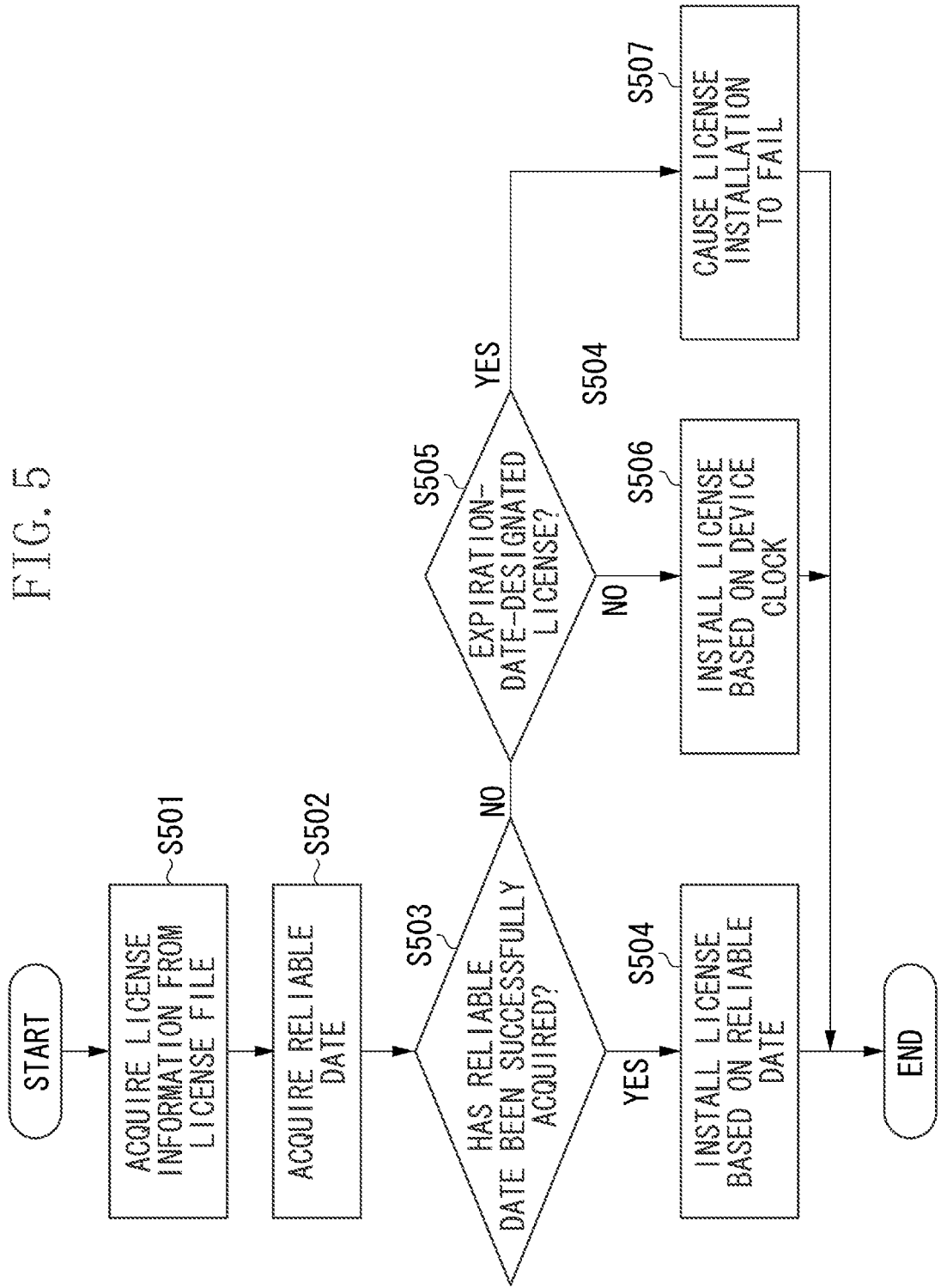

INFORMATION PROCESSING APPARATUS, INFORMATION PROCESSING METHOD, AND COMPUTER-READABLE MEDIUM

BACKGROUND

Field

The present disclosure relates to an information processing apparatus, an information processing method, and a computer-readable medium that are particularly suitable to be used for executing an application.

Description of the Related Art

Extended functions are prepared as optional functions in some image forming apparatuses including standard basic functions such as a copying function, a printing function, and a scanning function. A user who wishes to use such an extended function purchases a product (application) providing the extended function, thereby receiving a license of the product. Then, the product is installed in the image forming apparatus to be used in the image forming apparatus (see Japanese Patent Application Laid-Open No. 2012-221054). Japanese Patent Application Laid-Open No. 2012-221054 discusses that the license includes a valid period for which the product is usable under the license.

The technique discussed in Japanese Patent Application Laid-Open No. 2012-221054, manages the remaining valid period during which the application is usable in the image forming apparatus. Such a technique does not provide for managing the valid period of the license for usage of the application. For example, unauthorized change of a time managed by the image forming apparatus results in discrepancy between the valid period of the license for usage of the application and the actual valid period.

SUMMARY

The present disclosure is directed to achieving appropriate management for a valid period of an application.

An information processing apparatus according an aspect of to the present invention includes an acquisition unit configured to acquire a license related to usage of an application, the license including information designating a valid period of the application, a communication unit configured to communicate with an external apparatus, and a control unit configured to control installation of the license based on one or more of whether information on current time managed by the external apparatus has been acquired from the external apparatus and a method for designating the valid period in the information designating the valid period in the license.

Further features will become apparent from the following description of exemplary embodiments with reference to the attached drawings.

BRIEF DESCRIPTION OF THE DRAWINGS

FIG. 5 is a flowchart illustrating a first example of processing executed by the image forming apparatus.

DESCRIPTION OF THE EMBODIMENTS

Figure 1:
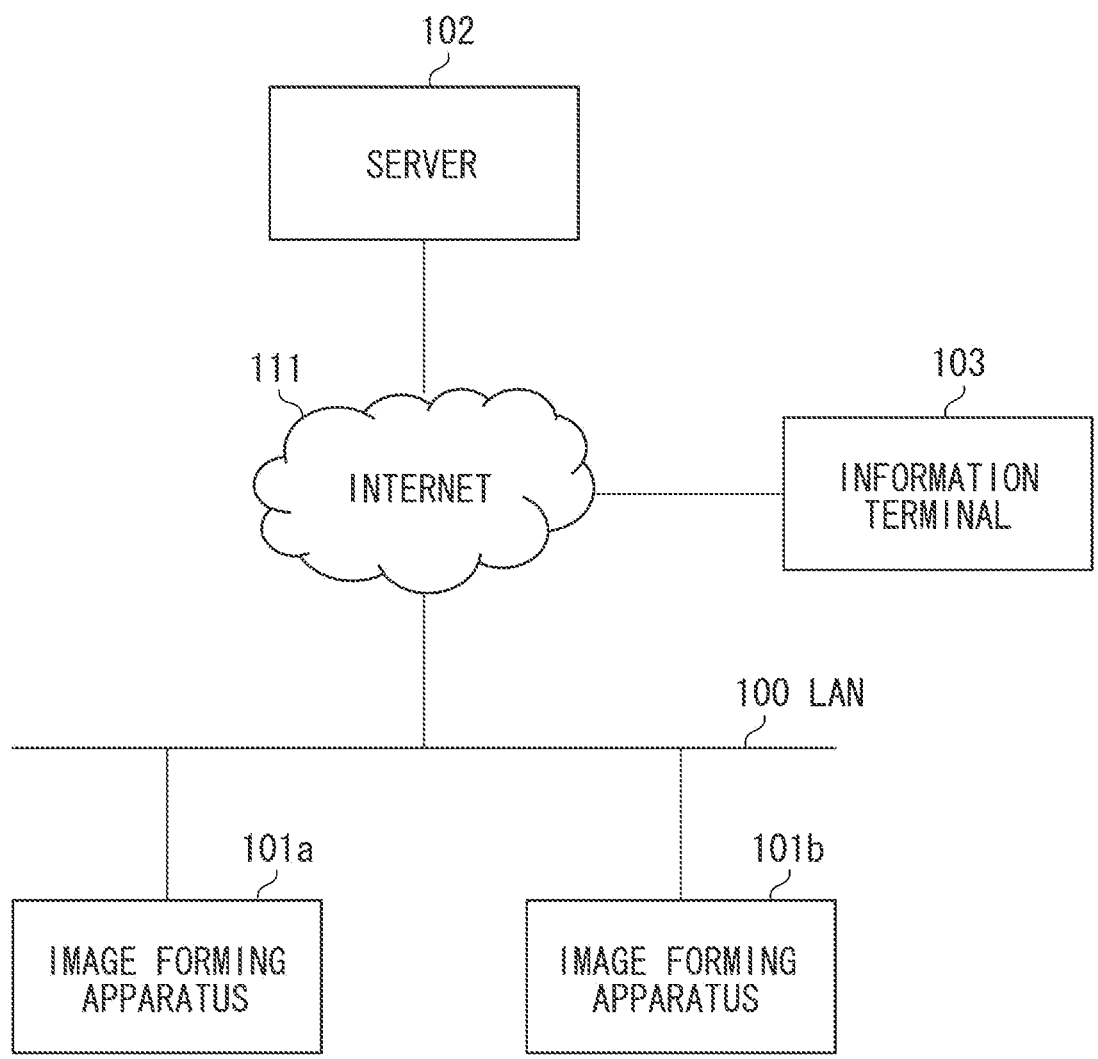
FIG. 1 is a diagram illustrating a configuration of an image forming system.

Exemplary embodiments are described in detail below with reference to the drawings. Note that components described in the following exemplary embodiments are merely examples, and the following exemplary embodiments are not seen to be limiting.

A first exemplary embodiment will now be described.

When a valid period of a product is set to a license, a period such as the number of days (for example, 10 days), or a usage start timing and a usage end timing such as a usage start date and a usage end date can be set. In such a case, a function provided by the product needs to be limited or disabled when the valid period set to the product expires, so that unauthorized use of the product can be prevented after the expiration.

Thus, usage of a product, acquired by a user, can be limited based on the date indicated by a built-in clock in an image forming apparatus in which the product is installed. More specifically, the image forming apparatus compares the date indicated by the built-in clock in the image forming apparatus with the date of the valid period set in a program or a license file. The product can be normally operated (with functions partially limited in some cases) as long as the valid period has not expired yet. When the valid period expires, the image forming apparatus only enables the operation of the function provided by the product in a limited manner or disables the operation, so that the product cannot be used against the will of the provider of the product.

However, the date indicated by the built-in clock in the image forming apparatus is changeable by a user operation in many cases. Thus, if the date indicated by the built-in clock in the image forming apparatus is directly used for expiration period management, it leaves room for unauthorized use of a product using an expired expiration-date-designated license. A license with a usage start timing and a usage end timing designated is hereinafter referred to as an expiration-date-designated license. For example, assume that the date indicated by the built-in clock in the image forming apparatus is 2016 Oct. 1, while the actual date is 2016 Nov. 1. In such a situation, when an expiration-date-designated license for 2016 Oct. 1 to 2016 Oct. 31 is installed in the image forming apparatus, a product corresponding to the expiration-date-designated license can be used on 2016 Nov. 1.

In view of this, the image forming apparatus can be configured to determine whether the license is valid by acquiring a reliable date from an external server. However, a license in which the number of valid days is designated (hereinafter, referred to as a valid-days-designated license) is managed based on the number of days elapsed after the license has been installed in the image forming apparatus. The valid-days-designated license is to enable a product to be operated in the image forming apparatus without the reliable date acquired from the external server. The valid-days-designated license is unusable in an off-line environment where the reliable date cannot be acquired from the external server.

In view of the above, the present exemplary embodiment provides a mechanism for enabling the valid-days-designated license to be used in an off-line environment while preventing unauthorized use of the expiration-date-designated license. The mechanism is one example of mechanisms for appropriately managing the valid period of an application.

FIG. 1 is a diagram illustrating an example of a configuration of an image forming system.

An image forming apparatus 101 (101a or 101b) is an apparatus (typically, a multifunction peripheral) that includes a function for forming an image.

A server 102 serves as a source of a reliable date to be acquired by the image forming apparatus 101. An application is a software program that enables the image forming apparatus 101 to utilize an extended function and/or standard function. A license is data that proves the right to use the application. Data on the license is registered to the image forming apparatus 101 and an application corresponding to the license is activated. This process is referred to as license installation. The user can use the activated application.

An execution file for operating the application can be incorporated in firmware of the image forming apparatus 101 in advance or can be downloaded to the image forming apparatus 101 at any time. The server 102 need not be a specific server, and can be any type of server, such as, for example, a cloud-based server.

An information terminal 103 is an information processing apparatus (typically, a personal computer). A user of the terminal can operate a web browser by using a keyboard, a mouse, and a display, or by using a touch panel of the information terminal 103. A local area network (LAN) 110 is a network line for establishing connection between the image forming apparatus 101 and the Internet 111 serving as an external network. The Internet 111 is a network with which the image forming apparatus 101, the server 102, and the information terminal 103 are connected to each other such that they can communicate with each other. The image forming apparatus 101 and the information terminal 103 can communicate with the server 102 via the LAN 110 and the Internet 111.

The image forming apparatuses 101a and 101b can be realized by the same configuration. As such, the following description is provided with the image forming apparatus 101a as an example.

Figure 2:
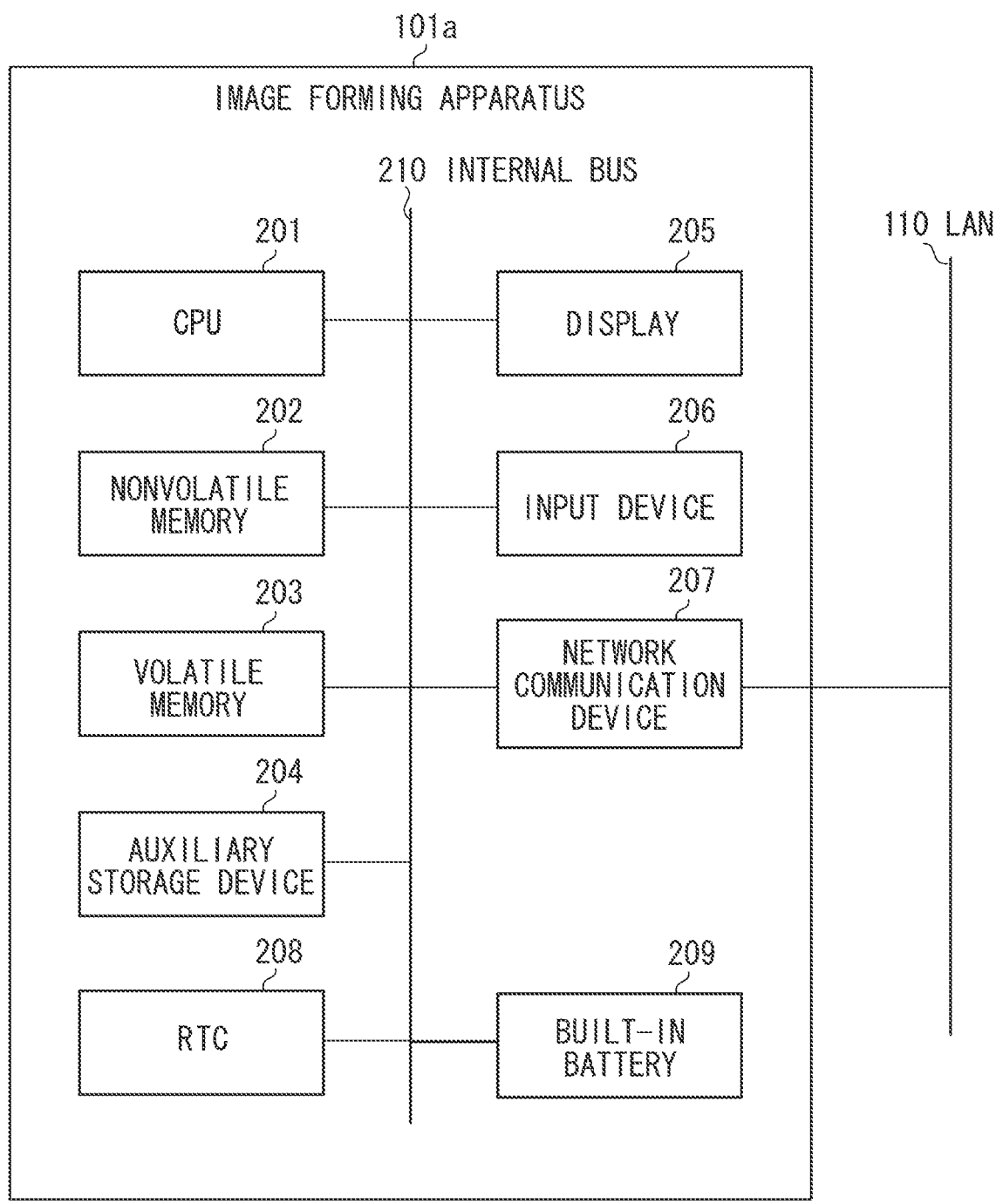
FIG. 2 is a diagram illustrating a hardware configuration of an image forming apparatus.

FIG. 2 is a diagram illustrating an example of a hardware configuration of the image forming apparatus 101a. A central processing unit (CPU) 201 executes a program and controls various types of processing. A nonvolatile memory 202 includes a read only memory (ROM). The nonvolatile memory 202 stores therein a program and data required in an initial stage of processing of starting the device. A volatile memory 203 includes a random-access memory (RAM). The volatile memory 203 is used as a temporary storage location for a program and data. An auxiliary storage device 204 includes a large-capacity storage device such as a hard disk and a RAM drive. The auxiliary storage device 204 stores large-volume data, holds a code for executing a program, holds setting values of the image forming apparatus 101, and the like. The auxiliary storage device 204 stores therein data that needs to be held for a relatively long period of time compared with data to be held in the volatile memory 203. The auxiliary storage device 204 is a nonvolatile storage device and thus can hold data even after the image forming apparatus 101 is turned OFF. A display 205 is a display device that presents information to the user.

An input device 206 receives a selection instruction from the user, and transmits the instruction to the program through an internal bus 210. A network communication device 207 enables the image forming apparatus 101 to communicate with other information devices through the LAN 110. A built-in battery 209 provides a battery backup for a real-time clock (RTC) 208. Thus, the RTC 208 can constantly count (measure) the date even when the image forming apparatus 101a is powered OFF. The RTC 208 enables the user to adjust the date. The internal bus 210 serves as a communication bus with which the hardware devices are connected with each other such that they can communicate with each other in the image forming apparatus 101. An example of a hardware configuration of each of the server 102 and the information terminal 103 is the same as that illustrated in FIG. 2. Thus, the detailed description of the hardware configuration of each of the server 102 and the information terminal 103 is omitted. The image forming apparatus 101a including the configuration described above also includes a printing unit and/or a scanner unit (not illustrated).

In the present exemplary embodiment, the image forming apparatus 101a is used to implement an example of an information processing apparatus. The server 102 is used to implement an example of an external apparatus that manages the current time. The RTC 208 is used to implement an example of a time measurement unit.

Figure 3:
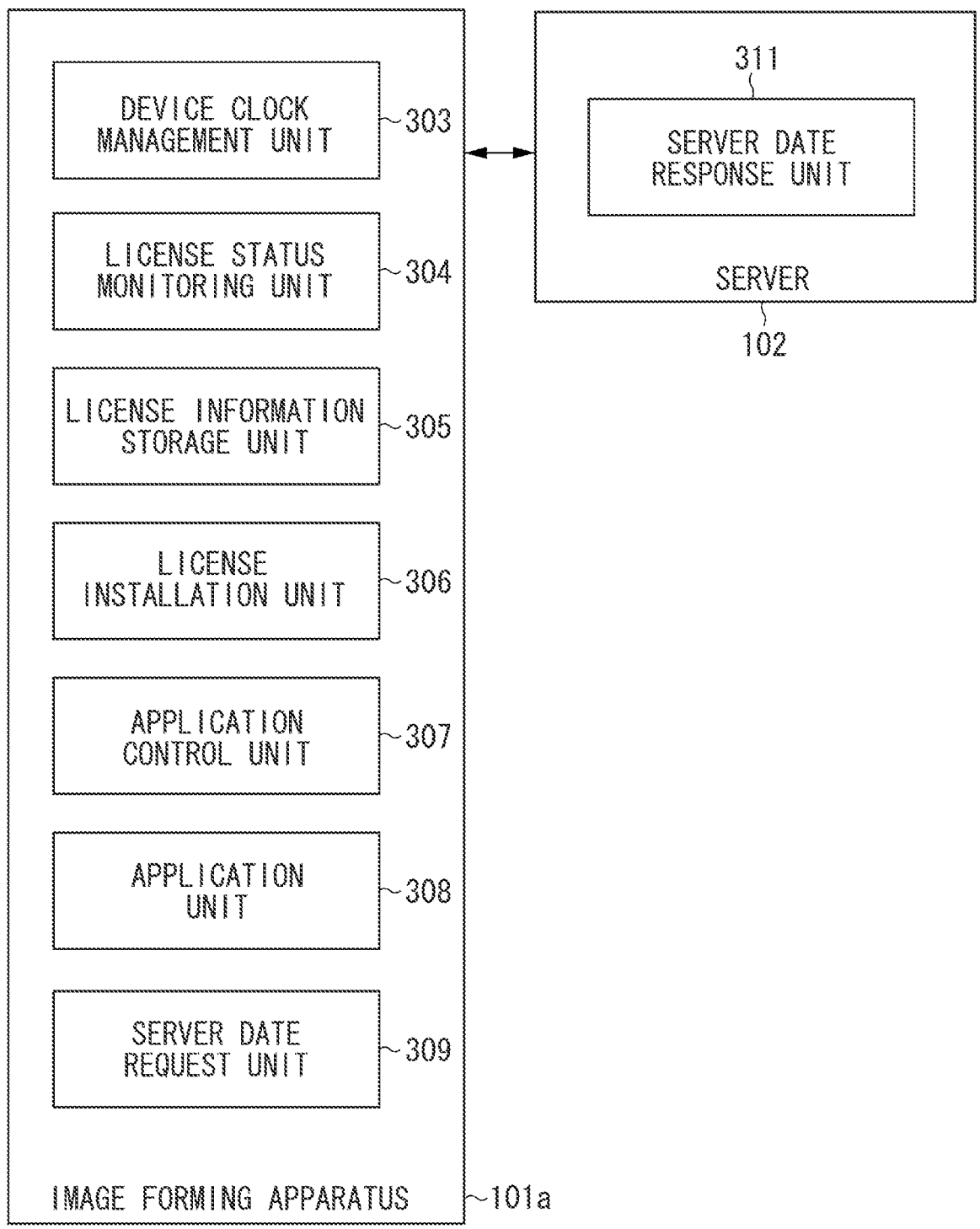
FIG. 3 is a diagram illustrating software configurations of the image forming apparatus and a server.

FIG. 3 is a diagram illustrating an example of software configurations of the image forming apparatus 101a and the server 102. Software units of the image forming apparatus 101a are stored in the nonvolatile memory 202 or the auxiliary storage device 204 of the image forming apparatus 101a, and provide functions upon being executed by the CPU 201. Various types of information, used when the software units of the image forming apparatus 101a are executed, are stored in the volatile memory 203 or the auxiliary storage device 204 of the image forming apparatus 101a, and are transmitted and received among the software units. Software units of the server 102 are also stored in a nonvolatile memory or an auxiliary storage device (not illustrated) of the server 102 as in the case of the software units of the image forming apparatus 101a, and provide functions upon being executed by a CPU similar to the CPU 201. Various types of information, used for executing the software unit of the server 102, are held in the nonvolatile memory or the auxiliary storage device (not illustrated) of the server 102, and are transmitted and received among the software units. The image forming apparatus 101a and the server 102 include software units implementing general functions implementable in the image forming apparatus 101a and the server 102, in addition to the software units illustrated in FIG. 3. FIG. 3 illustrates only units required for describing the present exemplary embodiment.

An example of the software units of the image forming apparatus 101a is described below.

A device clock management unit 303 includes a function of applying, when date indicated by the device clock is changed by the user of the image forming apparatus 101a using the display 205, the changed date information to the RTC 208. The device clock management unit 303 also includes a function of acquiring date information, such as current date, from the RTC 208.

A license status monitoring unit 304 monitors the status of a license for an application that runs on the image forming apparatus 101a. The license status monitoring unit 304 includes a function of deactivating an application for which the valid period of the license has already expired, using a function provided by an application control unit 307.

A license information storage unit 305 includes a function of storing information on a license installed in the image forming apparatus 101a, as a license for an application that runs on the image forming apparatus 101a, in the nonvolatile memory 202.

A license installation unit 306 includes a function of installing a license, instructed to be installed, in the image forming apparatus 101a. When the license is installed in the image forming apparatus 101a, license information (Table 1) recorded in the nonvolatile memory 202 is updated. Table 1 illustrates an example of the license information.

TABLE 1

| Application identifier | Usage start date | Usage end date | License status |
| --- | --- | --- | --- |
| 1 | — | 2016 Oct. 5 | Installed |
| 2 | 2016 Oct. 1 | 2016 Oct. 31 | Installed |

Figure 4A:
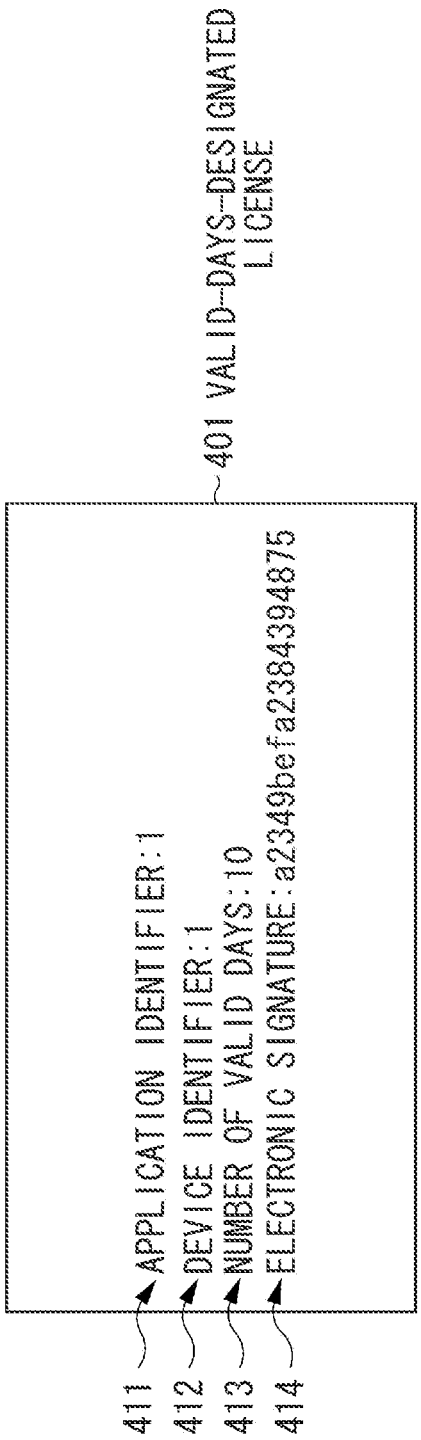
FIGS. 4A and 4B are each a diagram illustrating a license.
Figure 4B:
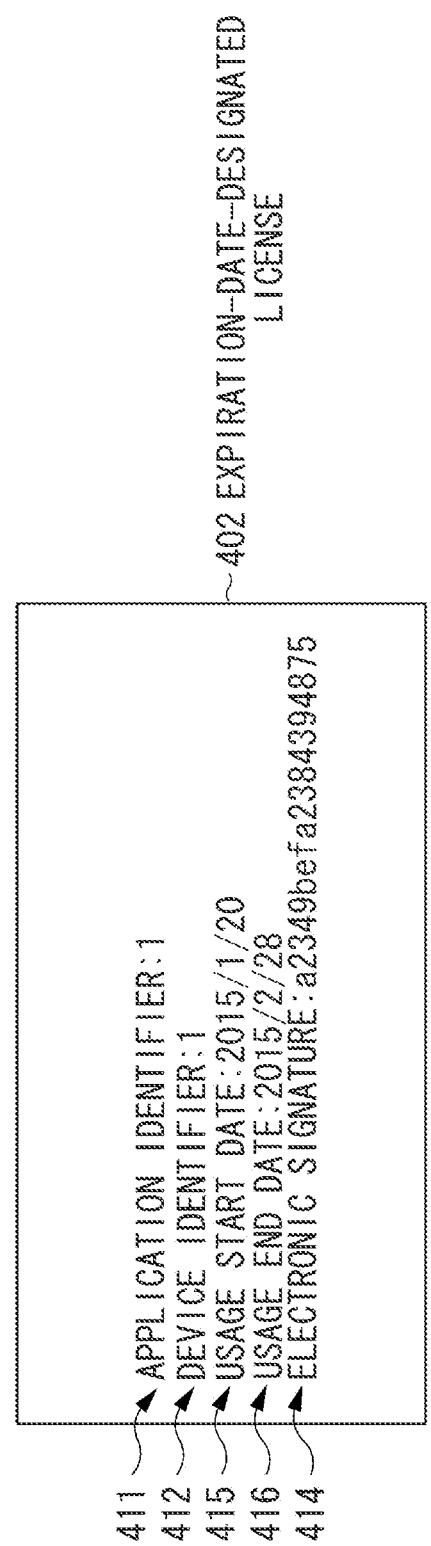

FIGS. 4A and 4B each illustrate an example of a license. FIG. 4A illustrates an example of a valid-days-designated license 401. FIG. 4B illustrates an example of an expiration-date-designated license 402.

The valid-days-designated license 401 and the expiration-date-designated license 402 are each a license in a file format and include information for specifying a right to use an application.

An application identifier 411 is an identifier for uniquely identifying an application that runs on the image forming apparatus 101a. In this example, the application identifier 411 is represented by a simple integer. The application identifier 411 can be configured to include a more complex character string or a Universally Unique Identifier (UUID). A device identifier 412 is an identifier for uniquely identifying the image forming apparatus 101a using the valid-days-designated license 401 or the expiration-date-designated license 402. Valid days 413 indicates the number of days the valid-days-designated license 401 is valid. Usage start date 415 indicates a usage start date set to the expiration-date-designated license 402. Usage end date 416 indicates a usage end date set to the expiration-date-designated license 402. Electronic signature 414 is a certificate for verifying the validity of the valid-days-designated license 401 or the expiration-date-designated license 402.

In the present exemplary embodiment, for example, the valid-days-designated license 401 and the expiration-date-designated license 402 are used to implement an example of a license including information designating the valid period of the application as a license related to the usage of an application. The valid days 413, the usage start date 415, and the usage end date 416 are used to implement an example of information for designating the valid period. The valid days 413 is used, for example, to implement a method (first method) for designating a usage period of an application, without designating a start timing and an end timing of the usage of the application. The usage start date 415 and the usage end date 416 are used to implement an example of a method (second method) for designating a usage start timing and a usage end timing of an application.

Referring again to FIG. 3, the license installation unit 306 checks whether the device identifier 412 in the license matches the device identifier of the image forming apparatus 101a. When the device identifiers match, the license installation unit 306 determines whether the license information in Table 1 includes a record including an application identifier that is the same as the application identifier 411 in the license. When there is a record including an application identifier that is the same as the application identifier 411 in the license, the license installation unit 306 overwrites the usage start date, the usage end date, and the license status of the record, and stores the overwritten record. When there is no record including an application identifier that is the same as the application identifier 411 in the license, the license installation unit 306 adds a new record. The license installation unit 306 stores the usage start date, the usage end date, and the license status for the added record.

In a case where the expiration-date-designated license 402 is installed, the license installation unit 306 sets the usage start date 415 to be the usage start date in the license information illustrated in Table 1, and sets the usage end date 416 to be the usage end date in the license information. In a case where the valid-days-designated license 401 is installed, the license installation unit 306 sets a date (year/month/day) on which the valid days 413 elapses from the current date as the usage end date in the license information illustrated in Table 1. The image forming apparatus 101a can determine whether a license is the expiration-date-designated license 402 or is the valid-days-designated license 401 by determining whether the license information in Table 1 includes a value indicating the usage start date. An application becomes usable when the license is installed in the image forming apparatus 101a. The application is a part of a product, and the product is to be provided to the user when the application becomes usable in the image forming apparatus 101a.

The application control unit 307 manages a life cycle of an application that runs on the image forming apparatus 101a. The application control unit 307 manages information, such as a version and a product name, and a status (activated or deactivated), for an application that runs on the image forming apparatus 101. The application control unit 307 provides a management screen (not illustrated) for an application, used by a system administrator. The system administrator can activate/deactivate an application, uninstall an application, and install a license using the management screen.

An application unit 308 is an application that runs on the image forming apparatus 101a and provides an extended function and/or a standard function to the image forming apparatus 101a. Operations of the application are controlled with the license. The application operates only when a valid license for the application is in the license information (Table 1) stored in the license information storage unit 305. For example, whether there is a valid license can be determined by searching the license information for a record including an application identifier that is the same as that of the application. In a case where the license is the valid-days-designated license 401, whether there is a valid license is determined by determining whether the current date is before the usage end date in the license information. In a case where the license is the expiration-date-designated license 402, whether there is a valid license is determined by determining whether the current date is within a period between the usage start date and the usage end date in the license information. When there is no record corresponding to the application identifier of the application, it is determined that there is no valid license.

Next, an example of software units of the server 102 is described.

A server date response unit 311 transmits the current date managed in the server 102 in response to a request from the image forming apparatus 101a.

FIG. 5 is a flowchart illustrating an example of a flow of processing executed by the image forming apparatus 101a to install a license.

In step S501, the license installation unit 306 acquires license information from a license file (i.e., the valid-days-designated license 401 or the expiration-date-designated license 402). In the present exemplary embodiment, the processing in step S501 implements an example of an acquisition unit configured to acquire a license.

Next, in step S502, a server date request unit 309 acquires a reliable date from the server 102. In this example, the current date is acquired as the reliable date. In the present exemplary embodiment, the processing in step S502 implements an example of a communication unit configured to communicate with an external apparatus that manages time information.

Next, in step S503, the server date request unit 309 determines whether the reliable date has been successfully acquired from the server 102. When the reliable date is determined to have been successfully acquired (YES in step S503), the processing proceeds to step S504. In step S504, the license installation unit 306 installs the license based on the reliable date, which is the current date. In this processing, the license installation unit 306 sets the usage start date and usage end date in the license information in Table 1, based on the reliable date. In the present exemplary embodiment, the processing in step S504 implements an example of installing, when information on current time is acquired from the external apparatus, a license based on time information specified by the information.

When the reliable date is determined to have failed to be acquired in step S503 (NO in step S503), the processing proceeds to step S505. In step S505, the license installation unit 306 determines whether the type of the license is the expiration-date-designated license 402. In the present exemplary embodiment, the processing in step S505 implements an example of identifying a method for designating the valid period in information designating the valid period in the license, when the information on the current time has not been acquired from the external apparatus by the communication unit.

When the type of the license is determined not to be the expiration-date-designated license 402, i.e., when the type of the license is determined to be the valid-days-designated license 401 (NO in step S505), the processing proceeds to step S506. In step S506, the license installation unit 306 installs the license based on the built-in clock (RTC 208) in the image forming apparatus 101a. In this processing, the license installation unit 306 sets the usage end date in the license information illustrated in Table 1, based on the date measured by the built-in clock (RTC 208) in the image forming apparatus 101a. In the present exemplary embodiment, for example, in a case where the determined method is the first method, an example of installing the license based on time information specified by time measured by the time measurement unit is implemented by the processing in step S506.

When the type of the license is determined to be the expiration-date-designated license 402 in step S505 (YES in step S505), the processing proceeds to step S507. In step S507, the license installation unit 306 causes the license installation to fail. In this processing, the license installation unit 306 can display information indicating that the license installation has failed on the display 205. In the present exemplary embodiment, for example, in a case where the determined method is the second method, an example of not installing the license is implemented by the processing in step S507.

As described above, in the present exemplary embodiment, the image forming apparatus 101a installs a license instructed to be installed when the reliable date is successfully acquired from the server 102. When the reliable date fails to be acquired and the license instructed to be installed is the valid-days-designated license 401, the image forming apparatus 101a installs the valid-days-designated license 401 based on the built-in clock in the image forming apparatus 101a. When the reliable date fails to be acquired and the license instructed to be installed is the expiration-date-designated license 402, the image forming apparatus 101a does not install the expiration-date-designated license 402. Thus, the valid-days-designated license 401 can be used off-line while unauthorized use of the expiration-date-designated license 402 can be prevented.

In the description of the present exemplary embodiment, the built-in clock in the image forming apparatus 101a can be set to match the reliable date acquired from the server 102. In this example, processing of setting the built-in clock in the image forming apparatus 101a to match the reliable date acquired from the server 102 can be additionally provided between steps S503 and S504. In the example described in the present exemplary embodiment, the time information for managing the valid period of the license is described in the time unit of year/month/day. However, how the time information for managing the valid period of the license is not limited to year/month/day. For example, the valid period of a license can be managed using the unit with time added to month/day/year. In a case where the image forming apparatus 101a that is aware of being in an offline state (a state of not being capable of communicating with an external apparatus), the processing in steps S502 to S504 can be omitted.

Next, a second exemplary embodiment is described. The image forming apparatus 101a according to the first exemplary embodiment inquires with the server 102 regarding the reliable date each time the license is installed, even when the reliable date was previously acquired from the server 102. This causes unnecessary network traffic to occur and also increases load on the server 102. Thus, the image forming apparatus 101a according to the present exemplary embodiment does not inquire with the server 102 regarding the reliable date if the reliable date was previously acquired from the server 102. Thus, the present exemplary embodiment is different from the first exemplary embodiment mainly in a part of the processing of inquiring with the server 102 regarding the date. In the description of the present exemplary embodiment, components that are the same as those in the first exemplary embodiment are denoted with the same reference numerals as those in FIGS. 1 to 5, and the detailed description thereof are omitted. The date according to the present exemplary embodiment described below is year/month/day, as in the first exemplary embodiment.

Figure 6:
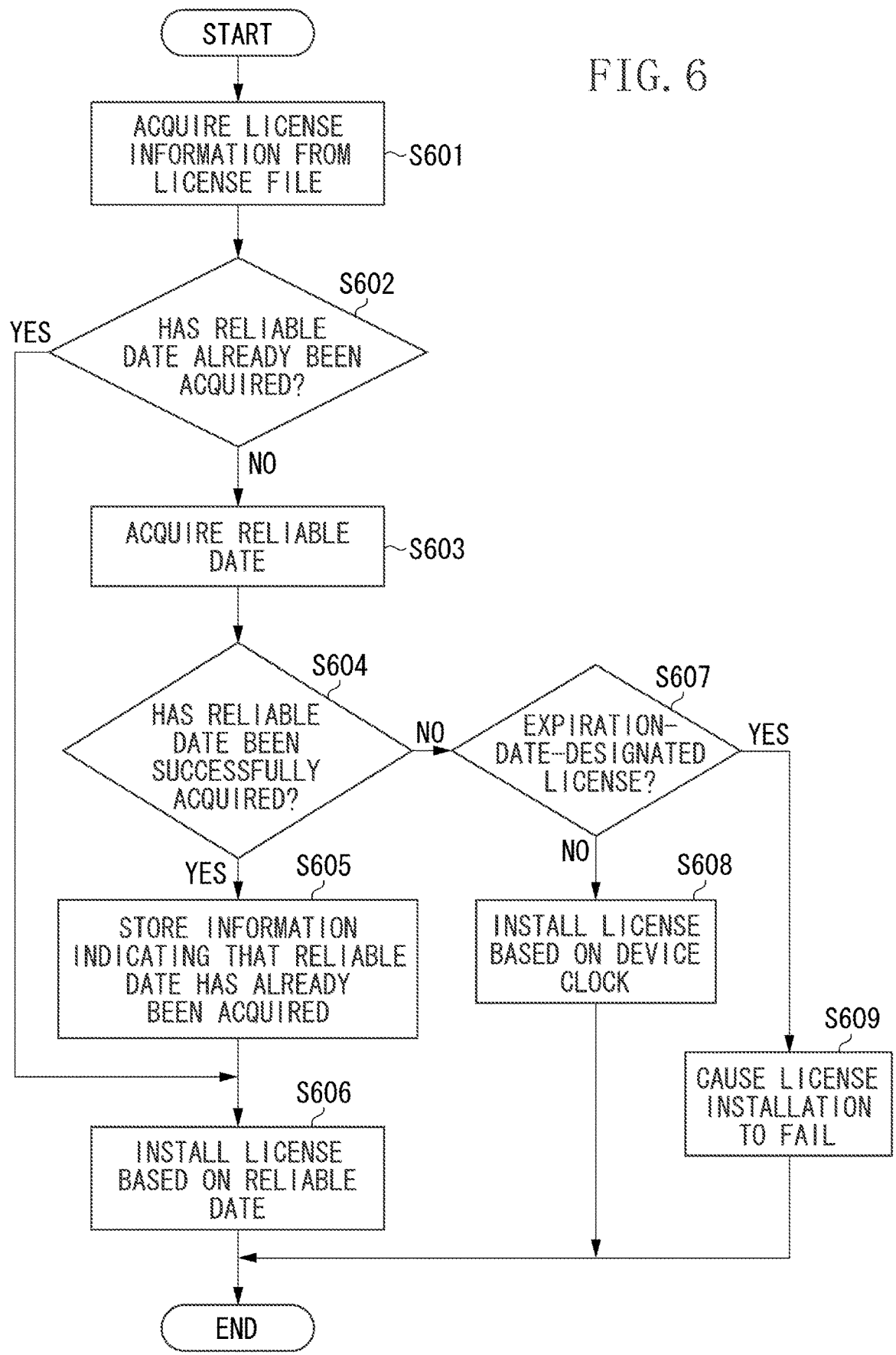
FIG. 6 is a flowchart illustrating a second example of processing executed by the image forming apparatus.

FIG. 6 is a flowchart illustrating an example of a flow of processing executed by the image forming apparatus 101a to install a license.

In step S601, the license installation unit 306 acquires license information from a license file (the valid-days-designated license 401 or the expiration-date-designated license 402). In the present exemplary embodiment, the processing in step S601 implements an example of the acquisition unit configured to acquire a license.

Next, in step S602, the server date request unit 309 determines whether the reliable date was previously acquired from the server 102, based on information stored in step S605 described below. When the reliable date is determined to have previously been acquired (YES in step S602), the processing proceeds to step S606 with processing in steps S603 to S605 skipped (without acquiring the reliable date from the server 102 again). In step S606, the license installation unit 306 determines the current date based on the reliable date that has been acquired, and installs the license based on the current date thus determined. In this example, the current date is acquired as the reliable date. For example, determination of the current date is implemented by measuring the elapsed time (number of days) from the reliable date acquired by the built-in clock (RTC 208) in the image forming apparatus 101a. The current date can also be determined by changing a current measurement value obtained by the built-in clock (RTC 208) in the image forming apparatus 101a to the reliable date when the reliable date is acquired.

In the present exemplary embodiment, for example, the case where the processing proceeds to step S606 with the processing in steps S603 to S605 skipped corresponds to a case where the information specifying that the information on time was previously acquired is stored in a storage unit. For example, when the processing proceeds to step S606 with the processing in steps S603 to S605 skipped, an example of not acquiring the information on time from the external apparatus is implemented. The processing in step S606 implements an example of installing a license based on the time information specified by the information on time previously acquired.

When the reliable date is determined not to have been acquired from the server 102 yet in step S602 (NO in step S602), the processing proceeds to step S603. In step S603, the server date request unit 309 acquires the reliable date from the server 102. In the present exemplary embodiment, the processing in step S603 implements an example of the communication unit configured to communicate with an external apparatus. Next, in step S604, the server date request unit 309 determines whether the reliable date has been successfully acquired from the server 102. When the reliable date is determined to have been successfully acquired (YES in step S604), the processing proceeds to step S605. In step S605, the server date request unit 309 stores the information indicating that the reliable date has previously been acquired in the nonvolatile memory 202. In the present exemplary embodiment, the processing in step S605 implements an example of a storage unit configured to store the information indicating that the information on the current time has previously been acquired when the information on the current time has been acquired from the external apparatus by the communication unit.

In step S606, the license installation unit 306 installs the license based on the reliable date, which is the current date. In this processing, the license installation unit 306 sets the usage start date and usage end date in the license information illustrated in Table 1, based on the reliable date. In the present exemplary embodiment, when the processing proceeds from step S605 to step S606, this is an example of installing, if information on the current time has been acquired from the external apparatus, a license based on the time information specified by the information.

When the reliable date is determined to have failed to be acquired in step S604 (NO in step S604), the processing proceeds to step S607. In step S607, the license installation unit 306 determines whether the type of the license is the expiration-date-designated license 402. In the present exemplary embodiment, the processing in step S607 implements an example of identifying a method for designating the valid period in the information designating the valid period in the license when the information on time has not been acquired from the external apparatus by the communication unit.

When the type of the license is determined not to be the expiration-date-designated license 402, i.e., when the type of the license is determined to be the valid-days-designated license 401 (NO in step S607), the processing proceeds to step S608. In step S608, the license installation unit 306 installs the license based on the built-in clock (RTC 208) in the image forming apparatus 101a. In this processing, the license installation unit 306 sets the usage end date in the license information illustrated in Table 1, based on the date measured by the built-in clock (RTC 208) in the image forming apparatus 101a. In the present exemplary embodiment, in a case where the determined method is the first method, an example of installing a license based on the time information specified by time measured by the time measurement unit is implemented by the processing in step S608.

When the type of the license is determined to be the expiration-date-designated license 402 in step S607 (YES in step S607), the processing proceeds to step S609. In step S609, the license installation unit 306 causes the license installation to fail. In this processing, the license installation unit 306 can display information indicating that the license installation has failed on the display 205. In the present exemplary embodiment, in a case where the determined method is the second method, an example of not installing the license is implemented by the processing in step S609.

The flowchart in FIG. 6 is different from the flowchart in FIG. 5 in the following points. In the flowchart in FIG. 6, a step (step S605) of storing the information indicating that the reliable date has previously been acquired in the nonvolatile memory 202 by the server date request unit 309 is additionally provided to the flowchart in FIG. 5. The flowchart in FIG. 6 also includes a step (step S602) of determining whether the reliable date has been acquired from the server 102, based on the information stored in step S605, by the server date request unit 309 in addition to the flowchart in FIG. 5.

As described above, the image forming apparatus 101a that previously acquired the reliable date from the server 102 does not acquire the reliable date from the server 102 thereafter. Thus, effects of reducing a load on the server 102 for transmitting the reliable date and preventing increase in unnecessary network traffic can be obtained, in addition to the effects described in the first exemplary embodiment.

The present exemplary embodiment can also employ the modifications described in the first exemplary embodiment.

In the present exemplary embodiment, when the reliable date has been acquired from the server 102, the reliable date is not acquired from the server 102 thereafter. However, the configuration is not limited thereto. For example, the server date request unit 309 can determine whether a predetermined period of time has elapsed after a time at which the reliable date has been acquired from the server 102, and, when the predetermined time has elapsed, acquire a reliable date from the server 102 to update the reliable date. This configuration enables the image forming apparatus 101a to periodically specify a reliable date.

Next, a third exemplary embodiment is described. In the first exemplary embodiment and the second exemplary embodiment, when the valid-days-designated license 401 or the expiration-date-designated license 402 is to be installed, the reliable date is acquired from the server 102 in step S502 or S603. The valid-days-designated license 401 previously installed based on the built-in clock in the image forming device 101a in step S506 or S608 exits if the reliable date has been successfully acquired. In this case, if the date based on which the license is managed is changed from the date indicated by the built-in clock in the image forming apparatus 101a to the reliable date, issues as described below can occur. In the description below, the date indicated by the built-in clock in the image forming apparatus 101a is referred to as device date as appropriate.

If the device date is set to be later than the reliable date, the application can be used for a longer period of time than the proper valid period. For example, if the valid-days-designated license with a valid period of 10 days is installed in a state where the device date is set to 2016 Oct. 1, the usage end date of the license is set to 2016 Oct. 11. If the date on which the reliable date is acquired from the server 102 thereafter is 2016 Sep. 1, the application corresponding to the license can be used for a period between 2016 Sep. 1 and 2016 Oct. 11.

If the device date is set to be earlier than the reliable date, the usable period of the application becomes shorter than the proper valid period. For example, if the valid-days-designated license with a valid period of 10 days is installed in a state where the device date is set to 2016 Oct. 1, the usage end date of the license is set to 2016 Oct. 11. If the date on which the reliable date is acquired from the server 102 thereafter is 2016 Oct. 5, the application corresponding to the license can only be used for a period between 2016 Oct. 5 and 2016 Oct. 11. Thus, the valid period of the application is shortened.

Such an issue is considered in the present exemplary embodiment. As described above, the present exemplary embodiment is different from the first exemplary embodiment and the second exemplary embodiment mainly in a part of the processing of setting the valid period of the license. In the description of the present exemplary embodiment, components that are the same as those in the first exemplary embodiment and the second exemplary embodiment are denoted with the same reference numerals as those in FIGS. 1 to 6, and the detailed description thereof are omitted. The date according to the present exemplary embodiment is year/month/day, as in the first exemplary embodiment and the second exemplary embodiment.

Figure 7:
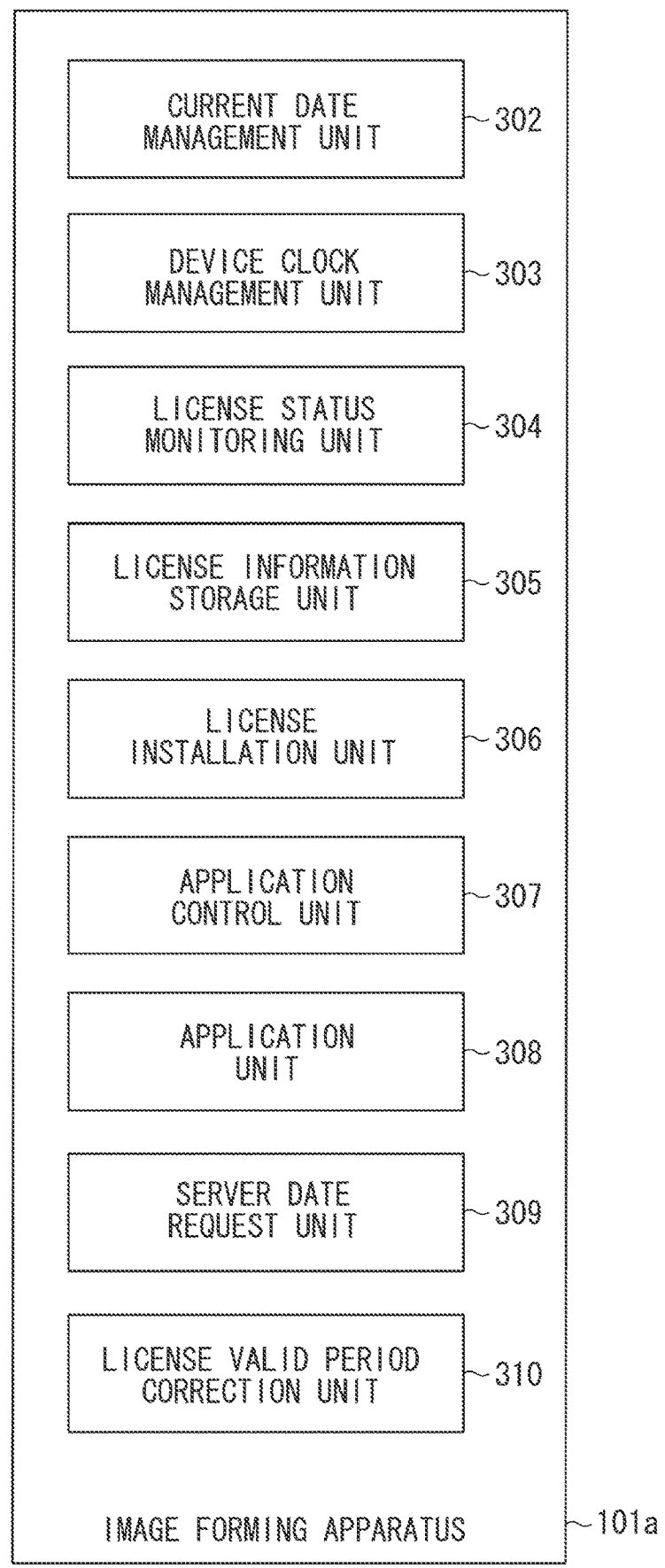
FIG. 7 is a diagram illustrating a software configuration of an image forming apparatus.

FIG. 7 is a diagram illustrating an example of a software configuration of the image forming apparatus 101a. A current date management unit 302 manages the current date without being affected by a change in the date indicated by the RTC 208. The current date management unit 302 sets the reliable date acquired from the server 102 to be the current date. The device clock management unit 303, the license status monitoring unit 304, the license information storage unit 305, the license installation unit 306, the application control unit 307, the application unit 308, and the server date request unit 309 are the same as those in FIG. 3, and will not be described in detail herein. A license valid period correction unit 310 corrects the valid period of the valid-days-designated license 401 that has been installed when the reliable date acquired from the server 102 is different from the device date.

Figure 8:
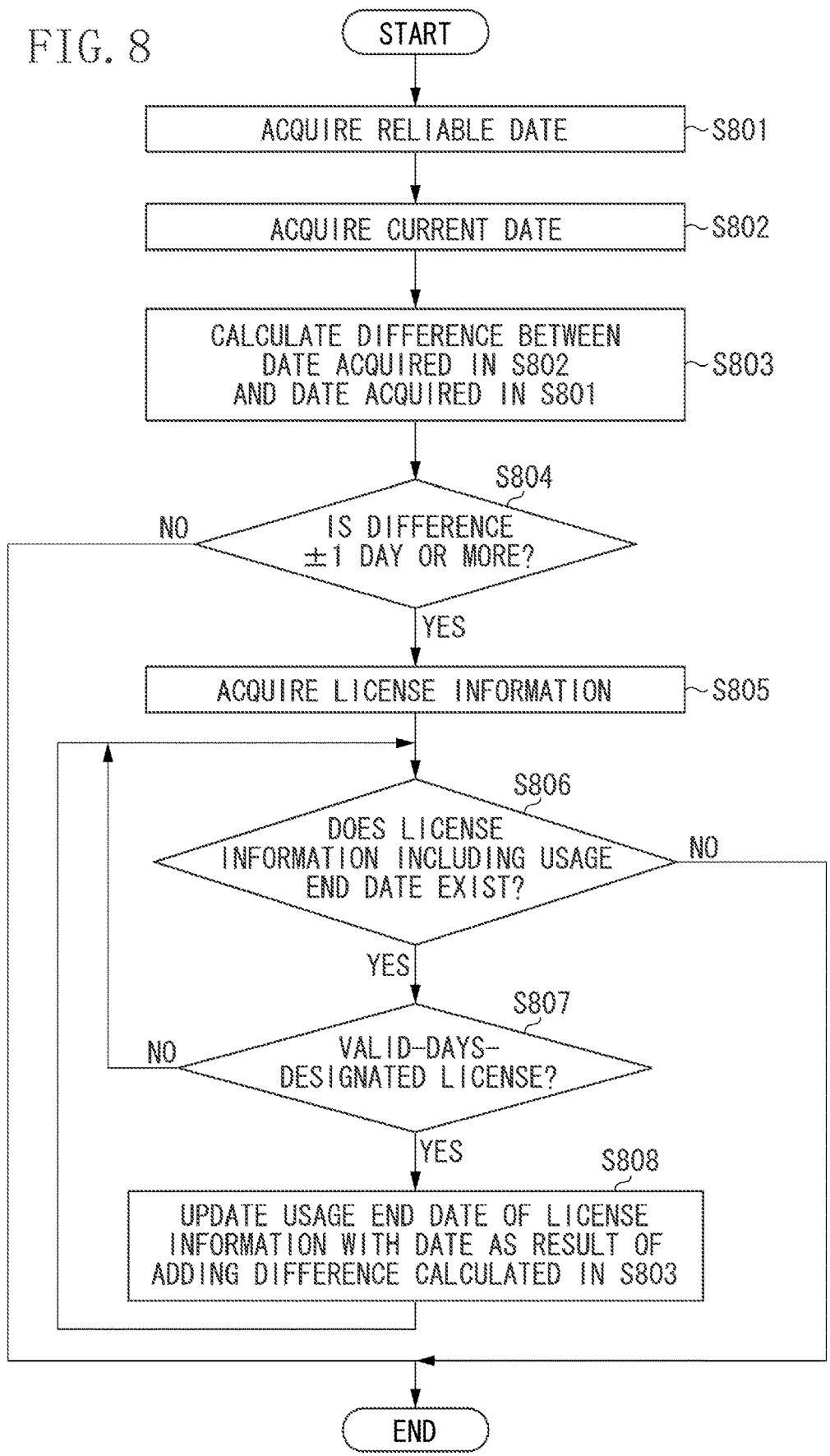
FIG. 8 is a flowchart illustrating processing executed by a license valid period correction unit.

FIG. 8 is a flowchart illustrating an example of a flow of processing for correcting the valid period of the valid-days-designated license 401 that has been installed, by the valid period correction unit 310, when the reliable date is acquired from the server 102.

In step S801, the license valid period correction unit 310 acquires the reliable date from the current date management unit 302. Then, in step S802, the license valid period correction unit 310 acquires the device date from the device clock management unit 303.

Next, in step S803, the license valid period correction unit 310 calculates a difference between the date acquired in step S802 and the date acquired in step S801. In the present exemplary embodiment, the difference implements an example of a difference between the time information specified by the time measured by the time measurement unit and the time information specified by the information on the time acquired by the communication unit. The processing in step S803 implements an example of an obtaining unit.

Next, in step S804, the license valid period correction unit 310 determines whether the difference, calculated in step S803, is ±1 day or more. The determination is based on ±1 day because the usage end date in the license information illustrated in Table 1 only includes information based on the unit of the number of days and does not include information based on the unit of time.

When the difference calculated in step S803 is determined to be less than ±1 day in step S804 (NO in step S804), the processing in the flowchart in FIG. 8 is terminated without updating the valid period. When the difference calculated in step S803 is determined to be ±1 day or more (YES in step S804), the processing proceeds to step S805. In step S805, the license valid period correction unit 310 acquires the license information (Table 1). Then, in step S806, the license valid period correction unit 310 determines whether the license information including the usage end date exists. When it is determined that no license information including the usage end date exists (NO in step S806), the processing in the flowchart in FIG. 8 is terminated without updating the valid period of the license.

When unselected license information including the usage end date exists (YES in step S806), the processing proceeds to step S807. In step S807, the license valid period correction unit 310 selects the license information. Then, the license valid period correction unit 310 determines whether the license information is license information corresponding to the valid-days-designated license 401. As described above in the first exemplary embodiment, the license information is the license information corresponding to the valid-days-designated license 401 if no usage start date is set therein.

When the selected license information is determined to be the license information corresponding to the valid-days-designated license 401 (YES in step S807), the processing proceeds to step S808. In step S808, the license valid period correction unit 310 updates the usage end date of the valid-days-designated license 401 with the date as a result of adding the difference calculated in step S803 to the usage end date. Then, the processing returns to step S806 to check the next license information. In the present exemplary embodiment, the processing in step S808 implements an example of a change unit configured to change the valid period of the license installed by the control unit, based on the difference obtained by the obtaining unit.

When the selected license information is determined not to be the valid-days-designated license 401, i.e., when the selected license information is determined to be the expiration-date-designated license 402 in step S807 (NO in step S807), the processing in the flowchart in FIG. 8 is terminated without updating the valid period of the expiration-date-designated license 402.

As described above, in the present exemplary embodiment, the valid period of the valid-days-designated license is changed based on the reliable date. Thus, effects of preventing unauthorized use of the valid-days-designated license due to a change in the date indicated by the built-in clock in the image forming apparatus and assuring a user of a proper valid period can be obtained in addition to the effects described in the first exemplary embodiment and the second exemplary embodiment.

The present exemplary embodiment can be applied to each of the first exemplary embodiment and the second exemplary embodiment. Thus, the present exemplary embodiment can employ the modifications described in the first exemplary embodiment and the second exemplary embodiment.

The exemplary embodiments described above are merely examples, and thus the technical scope of the present disclosure should not be construed in a limiting sense by the exemplary embodiments. That is, the present disclosure can be implemented in various ways without departing from its technical idea and main features.

The exemplary embodiments described above enable proper management of a valid period of an application.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-024960, filed Feb. 14, 2017, which is hereby incorporated by reference herein in its entirety.

What is claimed is:

1. An information processing device comprising:
a built-in clock that counts date and time;
one or more communication interfaces;
one or more processors; and
at least one memory storing executable instructions, which when executed by the one or more processors, cause the information processing device to:
acquire a license related to usage of an application, the license including information designating a valid period of the application;
identify whether information indicating a current time managed by an external apparatus is obtainable via one or more communication interfaces;
identify whether a method for designating the valid period included in the acquired license is a first method or a second method, wherein the first method is a method for designating valid days during which the application is usable after the license is installed in the information processing device, and wherein the second method is a method for designating at least a usage end time of the application;
not install the license in a case where the identified method is the second method and in addition where the information indicating the current time managed by the external apparatus is not currently obtainable via the one or more communication interfaces; and
install the license based on the date and time counted by the built-in clock in a case where the identified method is the first method and in addition where the information indicating the current time managed by the external apparatus is not currently obtainable via the one or more communication interfaces; and
install the license based on the obtained information indicating the current time managed by the external apparatus in a case where the information indicating the current time managed by the external apparatus is currently obtainable via the one or more communication interfaces.

2. The information processing device according to claim 1, wherein, when the information indicating the current time is acquired from the external apparatus, the built-in clock is set to match the current time acquired from the external apparatus.

3. The information processing device according to claim 2, wherein the instructions, when executed by the one or more processors, further cause the information processing device to:
when the information indicating the current time is acquired from the external apparatus, store, in a storage, information indicating that the information indicating the current time has previously been acquired;
perform control not to acquire the information indicating the current time from the external apparatus when the information indicating that the information indicating the current time has previously been acquired is stored in the storage; and
when the information indicating that the information indicating the current time has previously been acquired is stored in the storage, install the acquired license based on the time information specified by the information indicating the current time that has previously been acquired.

4. The information processing device according to claim 1, wherein the instructions, when executed by the one or more processors, further cause the information processing device to:
obtain a difference between the date and time counted by the built-in clock and the current time acquired from the external apparatus; and
change the valid period of the installed license based on the obtained difference.

5. An information processing method comprising:
acquiring a license related to usage of an application, the license including information designating a valid period of the application;
identifying whether information indicating a current time managed by an external apparatus is obtainable via one or more communication interfaces;
identifying whether a method for designating the valid period included in the acquired license is a first method or a second method, wherein the first method is a method for designating valid days during which the application is usable after the license is installed in the information processing device, and wherein the second method is a method for designating at least a usage end time of the application;
not installing the license in a case where the identified method is the second method and in addition where the information indicating the current time managed by the external apparatus is not currently obtainable via the one or more communication interfaces; and
installing the license the information indicating the current time managed by the external apparatus is not currently obtainable via the one or more communication interfaces; and
install the license based on the obtained information indicating the current time managed by the external apparatus in a case where the information indicating the current time managed by the external apparatus is currently obtainable via the one or more communication interfaces.

6. A non-transitory computer-readable medium storing one or more programs comprising instructions, which when executed by an information processing device, cause the information processing device to perform operations comprising:
acquiring a license related to usage of an application, the license including information designating a valid period of the application;
identifying whether information indicating a current time managed by an external apparatus is obtainable via one or more communication interfaces;
identifying whether a method for designating the valid period included in the acquired license is a first method or a second method, wherein the first method is a method for designating valid days during which the application is usable after the license is installed in the information processing device, and wherein the second method is a method for designating at least a usage end time of the application;
not installing the license in a case where the identified method is the second method and in addition where the information indicating the current time managed by the external apparatus is not currently obtainable via the one or more communication interfaces; and
installing the license the information indicating the current time managed by the external apparatus is not currently obtainable via the one or more communication interfaces; and
install the license based on the obtained information indicating the current time managed by the external apparatus in a case where the information indicating the current time managed by the external apparatus is currently obtainable via the one or more communication interfaces.

7. The non-transitory computer-readable medium according to claim 6, wherein when the information indicating the current time is acquired from the external apparatus, the built-in clock is set to match the current time acquired from the external apparatus.

8. The non-transitory computer-readable medium according to claim 7, further comprising:
storing, when the information indicating the current time is acquired from the external apparatus, information indicating that the information indicating the current time has previously been acquired;
performing control not to acquire the information indicating the current time from the external apparatus when the information indicating that the information indicating the current time has previously been acquired is stored; and
installing, when the information indicating that the information indicating the current time has previously been acquired is stored, the acquired license based on the time information specified by the information indicating the current time that has previously been acquired.

9. The non-transitory computer-readable medium according to claim 6, further comprising:
obtaining a difference between the date and time counted by the built-in clock and the current time; and
changing the valid period of the installed license based on the obtained difference.

* * * * *